July 6, 1965

T. A. HOYLE 3,192,662

FLEXIBLE SINKERS

Filed Aug. 5, 1963

INVENTOR.
Tonnie A. Hoyle,
BY Parker & Carter
Attorneys.

3,192,662
FLEXIBLE SINKERS
Tonnie A. Hoyle, Elmhurst, Ill.
(9344 Meredith Drive, Baton Rouge, La.)
Filed Aug. 5, 1963, Ser. No. 300,035
5 Claims. (Cl. 43—44.91)

This invention relates to a flexible sinker for use on fishing line or the like and is a continuation in part of my co-pending application Serial No. 192,215, filed May 3, 1962, which in turn is a continuation-in-part of application Serial No. 127,910, filed July 31, 1961.

A primary purpose of the invention is to provide a sinker of the type described which does not have to be tied or crimped onto a fishing line.

Another purpose is a sinker for use on fishing line or the like which includes sufficient elastomeric material, intimately mixed with a heavy metal, for example lead, to provide a sinker which is flexible and yet sufficiently heavy for the use described.

Another purpose is a sinker which will be completely non-damaging to delicate monofilament fishing line and which will possess non-slipping characteristics.

Another purpose is to provide a sinker of the type described which can be re-used.

Another purpose is to provide a sinker of the type described having at least one normally substantially closed groove, with the sinker mass being sufficiently flexible to permit opening of the groove for placement and removal of a fishing line.

Other purposes will appear in the ensuing specification, drawings and claims.

Figure 1:
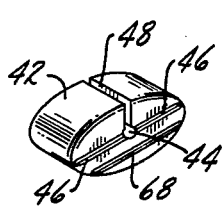
Figure 2:
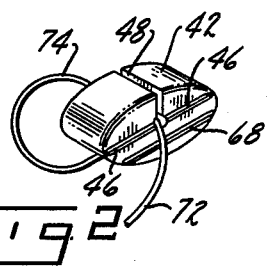
Figure 3:
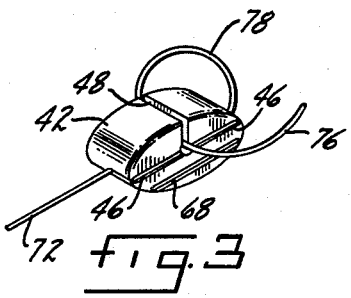
Figure 4:
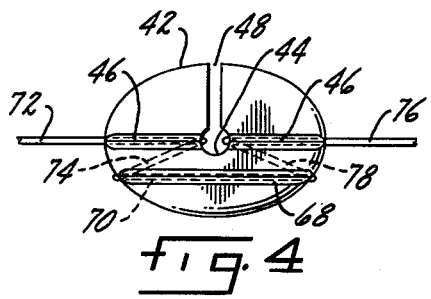
Figure 5:
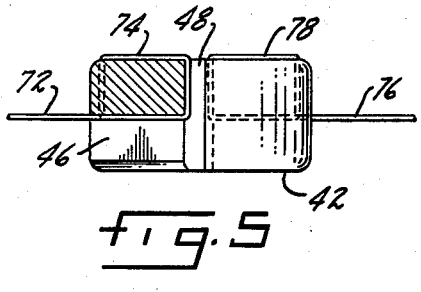

The invention is illustrated diagrammatically in the following drawings wherein:

FIGURE 1 is a perspective view of a sinker formed in accordance with the present invention, FIGURE 2 is a perspective view similar to FIGURE 1, but with a line shown in the initial stages of attachment, FIGURE 3 is a perspective view similar to FIGURE 1, but with a line shown in the advanced stages of attachment, FIGURE 4 is a side view of the sinker shown in FIGURES 1–3 with a fishing line attached, and FIGURE 5 is a top plan view in partial half section of the sinker shown in FIGURES 1–4.

In the past, various types of split lead shot, lead with a molded-in eyelet, or molded lead for crimping have been used for sinkers on fishing lines. Such sinkers required knots or a crimping action to attach them to the fishing line and, in general, the attachment of the sinker was tedious. Often there was line breakage at the point of contact with the sinker when a strong pull was exerted on the line, for example by a large fish.

The present invention provides a completely new type of sinker which is formed by the combination of an elastomeric material, such as polyvinyl chloride, plasticized or unplasticized, natural rubber, any synthetic rubber such as butyl, butadiene styrene, polybutadiene, or butadiene acrylonitrik, or any other elastomeric material which is suitable for use as a binder with heavy materials such as lead, copper, basic lead carbonate, litharge, zinc, zinc oxide, barytes, lead sulphate, sublined blue lead, etc. Any combination of materials from each of these two groups may be used to form the sinker of this invention. The particular materials are not important providing that there is an elastomeric or elastic material which provides flexibility and a heavy material, such as lead or the like, which adds weight to the sinker. This combination of intimately mixed and bonded materials may be in blue-green-gray color to resemble water color in depth.

A particularly satisfactory combination of ingredients for forming my flexible sinker utilizes the following materials:

| | Parts by wt. |
|---|---|
| Resin, polyvinyl chloride | 100 |
| Plasticizer, dioctyl phthalate | 50 |
| Heavy filler, lead powder | 1200 |
| Stabilizer, lead carbonate | 5 |
| Color, titanium dioxide | 10 |
| Lubricant, mineral oil | 2 |
| Lubricant, steric acid | 1 |
| Color, color to desire. | |

The above recipe or formula provides a material, when hot milled and extruded or molded, having relatively low strength, a specific gravity of approximately 5.5 and a hardness of about 65 DuroD. It should be realized that there are many variations from the above formula which will also provide satisfactory results. In particular, I have found that the binder content, or the amount of elastomeric material, which includes the resin and plasticizer, may vary from as low as about 8 percent to as high as about 20 percent, by weight, of the entire mass of the sinker. By the same token, the amount of metal or lead powder may vary from a high of about 92 percent to a low of about 80 percent, depending upon the amount of binder. Although the actual amount of each of the materials forming the sinker may vary considerably, the above percentages have been found to be satisfactory ranges for a successful fishing sinker of the type described. It is necessary that the sinker be flexible so that fishing line may be inserted and tightly held in the grooves. The desired strength, flexibility, hardness and specific gravity all dictate the binder content and the makeup of the sinker.

An important fact is that the sinker of the present invention has relatively low strength. Many prior combinations of a heavy metal and an elastomeric material for other uses had a low specific gravity and high strength. In fact, these combinations actually were a metal added to a basically elastomeric material. On the other hand, in the present invention I am adding an elastomeric material to a heavy material so as to impart some flexibility, while maintaining a greater percentage of metal for weight purposes.

The method of manufacture may vary. Any mixing process which provides an intimately mixed and bonded mass of the above ingredients is satisfactory. Any molding or forming process, with subsequent hole and groove formation, may be employed. Extrusion, injection or compression molding and transfer molding are all satisfactory.

The particular size and shape of the sinker is not important. The size will be dictated to a large extent upon the particular type fishing, size and weight of the line, etc.

Considering FIGURE 1, a sinker 42 may have a generally central bore or hole 44 which extends completely through the sinker. Extending outwardly and generally in opposite directions from the hole 44 are a pair of normally substantially closed grooves 46. The grooves may extend generally at right angles to the hole 44 and may extend approximately halfway through the mass. An additional normally substantially closed groove 68 is formed in the sinker and is generally parallel to the grooves 46. The groove 68 is radially spaced from hole 44. An opening or groove or slit 48 may be positioned at right angles to the grooves 46 and 68 and is parallel to hole 44. The opening 48 actually opens into the hole 44 throughout its length.

As the sinker is flexible, it is possible to easily remove the line from the grooves and hence take the sinker off the line. In this way the sinker may be re-used a number of times. This is normally not the case with split lead shot that must be crimped to the line. It is present practice to merely cut such shot off the line and throw it away.

The particular direction of the hole and grooves in the sinker is not important. What is important is the hole and groove relationship. They do not have to be precisely at right angles, but should be in this general angular relationship. The size of the hole and the grooves is not important and will vary depending upon the type of fishing line. For example, monofilament fishing line may be used with the sinker shown.

To attach the sinker shown herein, a length of line is first laid in groove 68. This line is illustrated in dotted lines at 70 in FIGURE 4. The line is pulled down to the bottom of the normally substantially closed groove 68 after which one end of the line, indicated at 72 in FIGURE 2, is passed through the opening 48 and then laid down in one of the grooves 46. A loop 74 is formed and this loop is closed after the end 72 is laid down in the left-hand groove 46 and the line is pulled tight. The other end of line 76 is then passed through the opening 48 into the hole 44 and laid down in the right-hand groove 46. Note loop 78 in FIGURE 3. End 76 is then pulled tight to close the loop, with the final result being as illustrated in FIGURES 4 and 5. Loops 74 and 78 each pass through the central hole 44 and then lie in one of the grooves 46. In all cases, it is advantageous to pull the line tightly down in the grooves as far as it will go.

The use, operation and function of the invention are as follows:

I provide a flexible heavy sinker in the form of a mass having a hole and a pair of oppositely extending grooves. Preferably, I use an elastomeric material, either a plastic or a rubber material, and a heavy material, for example in powder form, such as lead, or a lead pigment, to give the sinker weight. The elastomeric material provides flexibility so that the fishing line may be held securely to the sinker but yet which will permit the removal of the sinker after fishing.

Although the particular combination of an elastomeric material and a heavier metal-like material has been shown in conjunction with a hole and groove arrangement satisfactory for easy attachment to the line, I may use this same combination of ingredients in other forms of sinkers. For example, I contemplate the use of a sinker having a generally parallel grooves on opposite sides or completely encircling the mass forming the sinker. In such an arrangement, the fishing line may be wrapped around the sinker and positioned in the grooves. Because the sinker is flexible, the grooves will securely hold the line and hence provide a secure attachment of the sinker and line. This same combination of materials may be used to form a long thin rope-like sinker; also a sinker with a single groove.

Although the invention has been described in connection with the forming of a heavy sinker, the hole and groove arrangement could also be used in the formation of a float made of a plastic, or the like, for example expanded polystyrene.

Of particular importance in the invention is the fact that the grooves are normally substantially closed, but because the mass is flexible, these grooves may be easily opened for placement and removal of the fishing line. It is not necessary to tie the line to the sinker, nor is it necessary to crimp the sinker in any way to the line. The sinker is flexible, and the grooves will open so that the line may be inserted and pulled down into the bottom of the grooves. The grooves will then close and will firmly hold the line until the grooves are again physically opened up to permit removal of the line.

Whereas the preferred form of the invention has been shown and described herein, it should be realized that there are many modifications, substitutions and alterations thereto, within the scope of the following claims.

I claim:

1. In a flexible sinker for use on fishing lines or the like, a solid mass including an elastomeric material and a heavy metal intimately mixed and bonded together, said mass having a hole extending completely through it and a pair of grooves extending from the hole outward to opposite edges of the mass, said grooves being normally substantially closed, an additional normally substantially closed groove, generally parallel to said pair of grooves and radially spaced from said hole, said mass being flexible to permit said grooves to be opened for placement and removal of a fishing line therein, said pair of grooves extending generally in opposite directions, and being generally at right angles to the axis of the hole.

2. The structure of claim 1 further characterized in that said pair of grooves extend approximately halfway through said mass in a direction parallel to the axis of the hole.

3. The structure of claim 1 further characterized in that said elastomeric material constitutes from about eight to about 20 percent of said mass, by weight, with the remaining portion of said mass being substantially completely made up of said heavy metal.

4. In a flexible sinker for use on fishing lines or the like, a solid mass including an elastomeric material and a heavy metal intimately mixed and bonded together, said mass having a hole extending completely through it and a pair of grooves extending from the hole outward to opposite edges of the mass, said grooves extending generally in opposite directions and being generally at right angles to the axis of the hole, an additional groove, generally parallel to said pair of grooves, and radially spaced from said hole, all of said grooves being normally substantially closed, said mass being flexible to permit all of said grooves to be opened for placement and removal of a fishing line therein, and an opening, generally at right angles to said pair of grooves and parallel to the axis of said hole, said opening being in communication with said hole throughout its length.

5. The structure of claim 3 further characterized in that said heavy metal is formed of lead powder.

References Cited by the Examiner

UNITED STATES PATENTS

| | | | |
|---|---|---|---|
| 2,038,108 | 4/36 | Henley | 43—44.9 |
| 2,636,305 | 4/53 | Schoenfelt | 43—44.95 |
| 2,753,652 | 7/56 | Romaine | 43—44.9 X |
| 2,807,907 | 10/57 | Brite | 43—44.91 |
| 2,831,288 | 4/58 | Killebrew | 43—44.97 X |
| 2,845,660 | 8/58 | Peiler | 106—290 X |
| 2,983,068 | 5/61 | Grayson | 43—44.89 |
| 3,043,043 | 7/62 | Parry | 43—43.1 |

ABRAHAM G. STONE, *Primary Examiner.*